US006871218B2

(12) United States Patent
Desai et al.

(10) Patent No.: US 6,871,218 B2
(45) Date of Patent: Mar. 22, 2005

(54) METHODS AND SYSTEMS FOR PREEMPTIVE AND PREDICTIVE PAGE CACHING FOR IMPROVED SITE NAVIGATION

(75) Inventors: Sachin Desai, San Francisco, CA (US); Kiran Gurudutt Bellare, San Jose, CA (US); Max Schireson, Los Altos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 532 days.

(21) Appl. No.: 10/011,073

(22) Filed: Nov. 7, 2001

(65) Prior Publication Data

US 2003/0088580 A1 May 8, 2003

(51) Int. Cl.[7] ............................................. G06F 15/167
(52) U.S. Cl. ....................... 709/213; 709/214; 709/215; 709/217; 711/113; 711/137; 711/213
(58) Field of Search ................................. 711/113, 137, 711/213; 709/213, 214, 215, 217

(56) References Cited

U.S. PATENT DOCUMENTS

| | | | | |
|---|---|---|---|---|
| 6,098,064 A | * | 8/2000 | Pirolli et al. | 707/2 |
| 6,182,133 B1 | * | 1/2001 | Horvitz | 709/223 |
| 6,622,168 B1 | * | 9/2003 | Datta | 109/219 |

FOREIGN PATENT DOCUMENTS

WO     WO 98/59481     12/1998

OTHER PUBLICATIONS

Duchamp D: "Prefetching hyperlinks" 2nd Usenix Symposium on Internet Technologies and Systems, Poceedings of Technologies and Systems, Boulder, CO, USA, Oct. 11–14, 1999, pp. 127–138.*

Bestavros, "Using speculation to reduce server load and service time on the WWW" Proceedings of the International Conference on Information and Knowlege Management, 1995, pp. 403–410, XP000829545.

Duchamp, "Prefetching hyperlinks" 2nd Usenix Symposium on Internet Technologies and Systems, Proceedings of Usenix '99: 2nd Symposium on Internet Technologies and Systems, Boulder, CO, Oct. 11–14, 1999, pp. 127–138, XP002266381.

* cited by examiner

Primary Examiner—T Nguyen
(74) Attorney, Agent, or Firm—Young Law Firm, P.C.

(57) ABSTRACT

A method for a first computer to request documents from a second computer inacludes steps of sending a first request for a first document to the second computer responsive to a first user action, receiving the first document sent by the second computer responsive to the first request; identifying all references to second documents in the received first document; independently of any user action, automatically sending a second request for at least one of the second documents referred to by the identified references; receiving the second document(s) requested by the second request and storing the received second document(s) in a storage that is local to the first computer, and responsive to a user request for one or more of the second documents, attempting first to service the user request from the local storage and sending a third request to the second computer for second document (s) only when the second document(s) is not stored in the local storage. A method of servicing a request for access to a Web site by a remote computer may include a receiving step to receive the request for access to the Web site; a first sending step to send a first page of the accessed Web site to the remote computer responsive to the request, and independently of any subsequent request for a second page of the Web site originating from the remote computer, preemptively carrying out a second sending step to send the remote computer at least one selected second page based upon a prediction of a subsequent request by the remote computer and/or a history of second pages previously accessed by the remote computer.

25 Claims, 5 Drawing Sheets

METHODS AND SYSTEMS FOR PREEMPTIVE AND PREDICTIVE PAGE CACHING FOR IMPROVED SITE NAVIGATION

BACKGROUND OF THE INVENTION

1. Field of the Invention

The present invention relates generally to the World Wide Web (hereafter, "Web"). More particularly, the present invention relates to methods and systems for improving the efficiency of navigating through Web sites.

2. Description of the Related Art

The Web has evolved from being a repository of static files (Hypertext Markup Language (HTML), Graphic Interchange Format (GIF) and the like) to a very dynamic system with Web sites that span the gamut of possibilities, from multi-media sites that broadcast music on demand to e-commerce Web sites linking consumers and businesses or businesses to other businesses. With this evolution in usage, there has been a corresponding change in the nature of the content served by Web sites. Indeed, an increasing number of Web pages served by Web sites, especially e-commerce Web sites and portals, are dynamically generated.

Whether serving static or dynamic Web pages, Web servers tend to deliver Web pages on demand. That is, whenever the user selects (e.g., clicks on) a hyperlink, the request for that link is sent to the Web server for processing and the corresponding Web page is returned to the user, typically to be rendered on a display by the user's browser software. This process is not instantaneous and the user is made to wait during the time interval between the request and the delivery of the requested page. This interval includes a transit time from the user's computer to the Web server, server's processing time during which the request is received, processed and the requested page assembled and the transit time as the requested page is sent to the user. This interval may take as little as one second to over 10 seconds, depending upon the content requested, the traffic on the network coupling the user's computer and the Web server and the load on the Web server, among other variables. This request-response cycle is then repeated for each subsequent page or document requested by the user.

Figure 1:
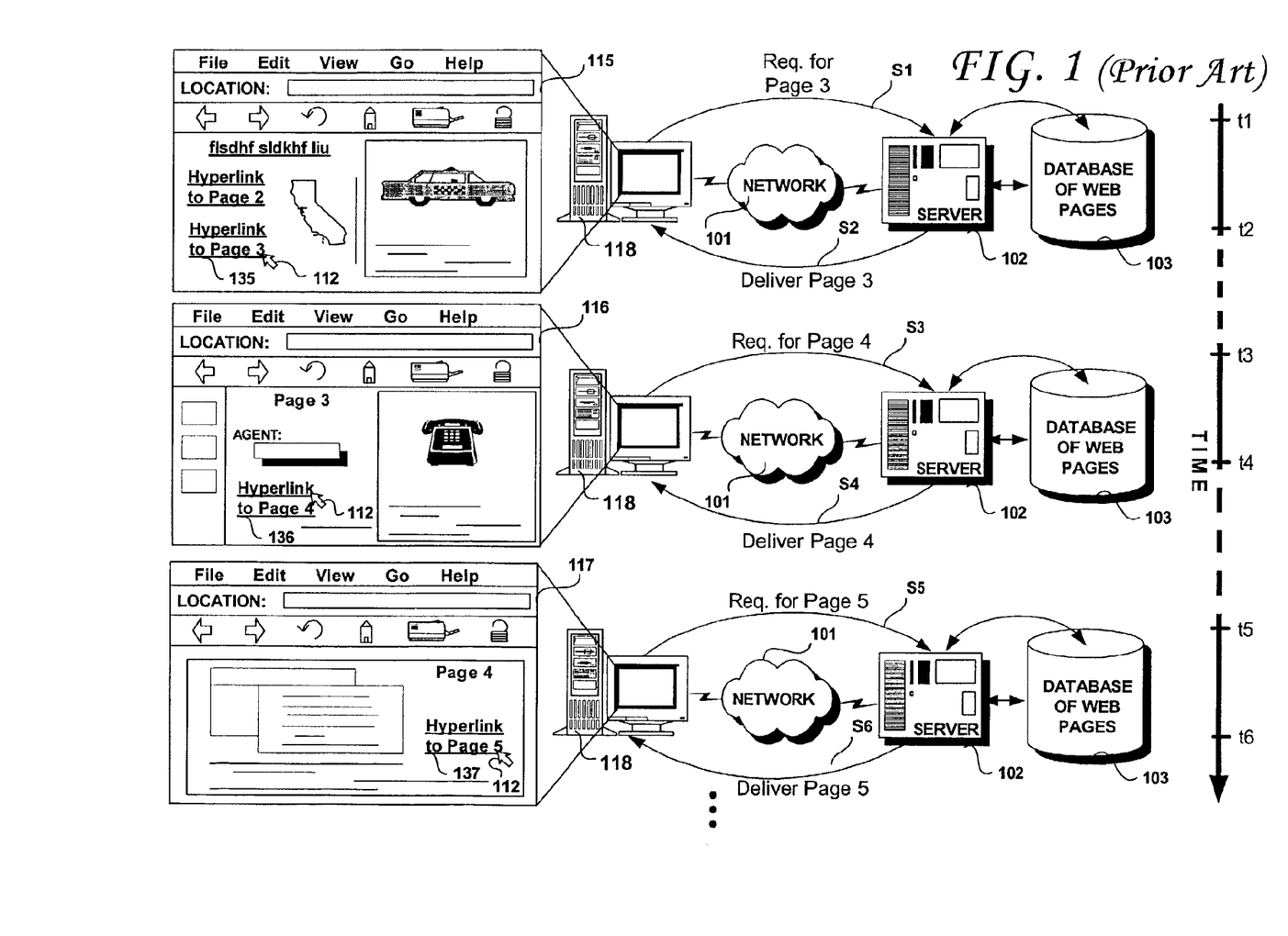
FIG. 1 illustrates a conventional request-response cycle between a user's computer and a remote server.

FIG. 1 illustrates such a conventional request-response cycle between a user's computer (the client in a client server architecture) and a remote server (the server in a client-server architecture). As shown therein, a user's computer 118 has accessed a Web page 115 from a Web server 102 over a computer network 101. The Web server 102 may be coupled to a database 103 that is accessed during the assembly of the requested Web pages. As shown at S1, the user, through the computer 118, makes a request for Page 3, by clicking or otherwise selecting hyperlink 135 on page 115 by means of cursor 112, for example. The request for Page 3 is transmitted across the network 101 and reaches the server 102 whereupon the request is processed, Page 3 is assembled by accessing database 103 (and/or other databases—to deliver advertisements, for example) and the assembled Page 3 is transmitted to the user's computer 118, as shown at S2. From the time that the user requested Page 3 at S1 to the time at which the requested Page 3 (shown at reference 116) was delivered back to the user's computer 118, an interval equal to t2–t1 has elapsed. For some time interval (equal to t3–t2), there may be no request for additional pages by the computer 118 to the Web server 102. During that interval, the user may be reading or otherwise assimilating Page 3, shown at 116. At time t3, the user in this example clicks or otherwise selects a hyperlink to Page 4, shown at 136. Therefore, the computer 118 issues a request for Page 4, shown at S3. The request is received by the server 102, processed and the requested Page 4 (shown at 117) is returned to the user's computer at S4 during the interval t4–t3. At some later time t5, the user may click on the hyperlink 137 to view Page 5, which generates a request S5 and a response S6 during an interval t6–t5. As indicated by the dashed lines, the intervals between t3 and t2 and between t5 and t4 are essentially idle. That is, the user is viewing the requested pages during these periods and no Web pages are requested or sent from the server 102 to the user's computer 118. Moreover, each time a user requests a Web page, he or she must wait for the request to be generated, transmitted, processed and the response from the server received. These potentially long waits may be frustrating to the user and may decrease his or her browsing experience at the Web site services by the server. In the case of an e-commerce site, such long waits may also result in customers defecting to more performing Web sites and lost sales.

What is needed, therefore, are methods and systems for more efficiently delivering content to users. More particularly, what are needed are methods and systems to efficiently utilize the currently underutilized resources of time and bandwidth.

SUMMARY OF THE INVENTION

It is, therefore, an object of the present invention to provide methods and systems for more efficiently delivering content to users. More particularly, what are needed are methods and systems to more efficiently utilize the currently underutilized resources of time and bandwidth. It is a further object of the present invention to improve the user's browsing experience by optimizing his or her navigation through Web sites. In accordance with the above-described objects and those that will be mentioned and will become apparent below, a method for a first computer to request documents from a second computer may include the steps of sending a first request for a first document to the second computer responsive to a first user action; receiving the first document sent by the second computer responsive to the first request; identifying all references to second documents in the received first document; independently of any user action, automatically sending a second request for at least one of the second documents referred to by the identified references in the first document; receiving the at least one second document requested by the second request and storing the received at least one second document in a storage that is local to the first computer, and responsive to a user request for at least one of the second documents, attempting first to service the user request from the local storage and sending a third request to the second computer for the at least one of the second documents only when the at least one of the second documents is not stored in the local storage.

The first document and/or one or more of the second documents may include an eXtensible Markup Language (XML) document. The first document and/or one or more of the second documents may include a Hyper Text Markup Language (HTML) document. The first and/or second documents may include a Web page. The first, second and/or third requests may include a Hyper Text Transfer Protocol (HTTP) request. The method may also include maintaining a history of the user requested second documents and sending the history to the second computer.

The present invention is also a computer configured to request documents from a second computer over a computer network, comprising at least one processor; at least one data storage device; a plurality of processes spawned by said at least one processor, the processes including processing logic for: responsive to a first user action, sending a first request for a first document to the second computer; receiving the first document sent by the second computer responsive to the first request; identifying all references to second documents in the received first document; independently of any user action, automatically sending a second request for one or more of the second documents referred to by the identified references in the first document; receiving at least one second document requested by the second request and storing the received second document(s) in a storage that is local to the first computer, and responsive to a user request for one or more of the second documents, attempting first to service the user request from the local storage and sending a third request to the second computer for the second document(s) only when the second document(s) is not stored in the local storage.

The present invention, according to another embodiment thereof, is a method of servicing a request for access to a Web site by a remote computer, comprising a receiving step to receive the request for access to the Web site; a first sending step to send a first page of the accessed Web site to the remote computer responsive to the request, and independently of any subsequent request for a second page of the Web site originating from the remote computer, preemptively carrying out a second sending step to send the remote computer one or more selected second page of the Web site based upon a prediction of a subsequent request by the remote computer, and/or a history of second pages of the Web site previously accessed by the remote computer.

The history may be maintained in a file that is retrieved from the remote computer, for example. The method may further comprise a step of servicing subsequent requests for second pages of the Web site originating from the remote computer. The method may also comprise a step of updating the history of previously accessed second pages based upon subsequent requests for second pages of the Web site originating from the remote computer. The updating step may include a step of assigning a weighting coefficient to each of the subsequently requested second pages based upon frequency of access. In this manner, the weighting coefficients may be used to control which second pages are preemptively sent to the remote computer in the second sending step. The prediction may be based upon detected movements of a pointing device coupled to the remote computer, for example. A step of retrieving a file from the remote computer may also be carried out, the file distinguishing the remote computer from among other remote computers. The file may include a cookie.

The present invention is also a computer configured to service a request for access to a Web site by a remote computer over a computer network, comprising at least one processor; at least one data storage device; a plurality of processes spawned by said at least one processor, the processes including processing logic for carrying out a receiving step to receive the request for access to the Web site; a first sending step to send a first page of the accessed Web site to the remote computer responsive to the request, and independently of any subsequent request for a second page of the Web site originating from the remote computer, preemptively carrying out a second sending step to send the remote computer one or more selected second page of the Web site based upon a prediction of a subsequent request by the remote computer, and/or a history of second pages of the Web site previously accessed by the remote computer.

DESCRIPTION OF THE INVENTION

Terminology

Page: As used herein, a page is a document, such as an XML or HTML document (such as a Web page, for example) generated by a server (such as a Web server) in response to a single request from a client, such as a HTTP request. The applicability of the present invention, however, is not restricted to HTML responses. For illustrative purposes only, however, a "Page" as used herein means a response from a server, such as an HTML or dynamic HTML (DHTML) Web page. This HTML document may include references to images and/or other rich data sources that may be resolved at the client side and the client may have to issue additional requests to obtain the embedded images, sound, JavaScript code snippets etc.

Functional Description

Figure 2:
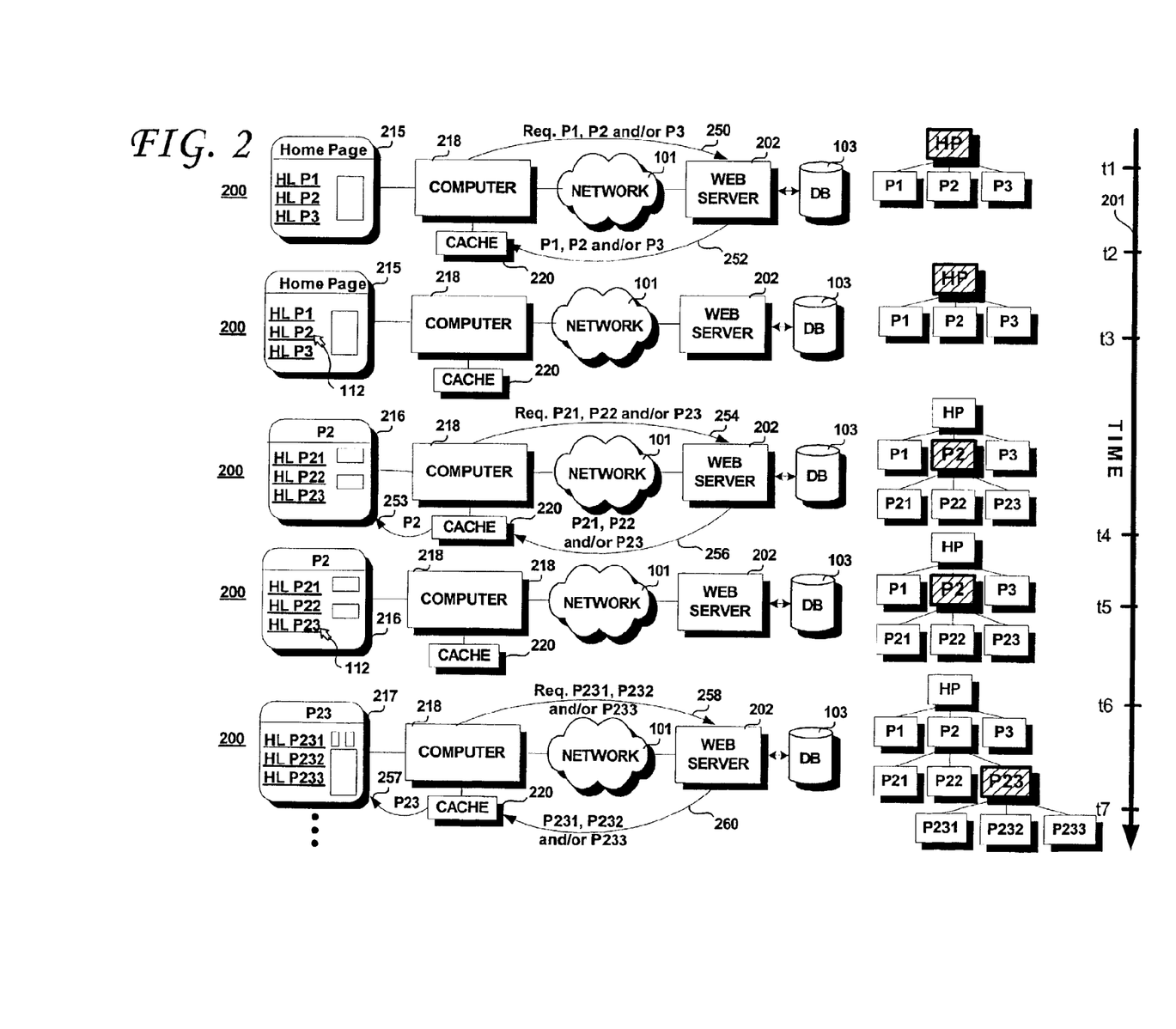
FIG. 2 illustrates aspects of a method of preemptive and predictive page caching, according to an embodiment of the present invention.

FIG. 2 illustrates aspects of a system and method for preemptive and predictive page caching according to an embodiment of the present invention. FIG. 2 illustrates the state of system 200 from an initial time t1 to a later time t7, as indicated by the time arrow 201. The system 200 includes a computer 218, such as a personal computer, workstation, mobile computing device or other computing appliance. The computer 218 is coupled to the network 101, which may include the Internet and/or another computer network. A Web server 202 is also coupled to the network 101. The Web server 202 may also be coupled to one or more databases 103 (directly or through the network 101), from which the Web server 202 may retrieve information to enable it to assemble documents such as Web pages (or portions thereof) for delivery to the computer 218. Specifically, responsive to a user action such as a mouse click or a manual entry of a Universal Resource Locator (URL), the computer 218 may send a Hypertext Transfer Protocol (HTTP) request for a Web page to the server 202 through the network 101. The Web server 202, in response thereto, may process the request, access the database(s) 130 as needed and may return the requested document (such as a Web page, for example) to the computer 218. For example, the requested document may represent a Web vendor's home page, as suggested by reference numeral 215 in FIG. 2.

Rather than relying upon serial cycles of user initiated HTTP requests and HTML responses by the server 202 (such as shown in FIG. 1), the present invention, according to one embodiment thereof, calls for the computer 218 to request and the Web server 202 to provide one or more documents (such as Web pages, for example) independently of any user action. In particular, an embodiment of the present invention calls for the computer 218 to automatically send a request for one or more documents referred to in the originally requested document. As shown in FIG. 2, the exemplary home page 215 contains a reference (in this case, a hyperlink) to three Web pages. That is, the home page 215 contains a hyperlink (HL P1) to a first page P1, a hyperlink (HL P2) to a second page P2 and a hyperlink (HL P3) to a third page P3. According to the present invention, the computer 218 may identify each of these hyperlinks HL P1, HL P2 and HL P3 and may request one or more of the pages P1, P2 and P3 referred to by the identified hyperlinks independently of the user, as shown at 250. Responsive to this request 250, the Web server 202 may retrieve and/or assemble the requested pages P1, P2 and/or P3 (and may access the database(s) 103 in the process) and may send the requested pages P1, P2 and/or P3 to the computer 218, as shown at 252. The computer 218, according to the present invention, may store these pages P1, P2 and/or P3 in storage that is local to the computer 218. This local memory is shown in FIG. 2 as cache memory 220. The cache memory 220, according to an embodiment of the present invention, may be maintained in the Random Access Memory (RAM) of the computer 218, for example. Alternatively, the local storage may be maintained on a hard disk or may be maintained in RAM and on a hard disk by a paging mechanism, for example. Other physical implementations of the local storage 220 will occur to those of skill in this art. This request 250 may be sent to the Web server 202 and the requested pages may be received by the computer 218 during the interval t2-t1; that is, during the time the user is browsing, reading or otherwise assimilating the currently downloaded page (in this case, the home page 215). The downloading of the pages P1, P2 and/or P3 may, therefore, occur asynchronously and in the background, taking full advantage of any interval during which the connection between the computer 218 and the Web server 202 is idle. This asynchronous downloading of pages from the server 202 to the remote computer 218 is carried out in the expectation that the next document or page to be requested by the user of the computer 218 will be among the pages stored in the cache 220. Thereafter, when the user of the computer 218 does select a next page (by clicking a hyperlink appearing on the currently displayed page, for example) at time t3, the desired page may have already been downloaded and may be available for nearly immediate viewing without waiting for the period of time conventionally associated with a full request—response cycle to and from the computer 218 and the Web server 202.

Continuing now with the example developed in FIG. 2, the user has selected page P2 as the next page he or she wishes to view and, therefore, uses a pointing device controlling the cursor 112 to click (for example) the hyperlink HL P2, as shown at time t3. As page P2 was previously downloaded during the time interval t2-t1, page P2 (shown at 216 in FIG. 2) may be very quickly retrieved from the cache 220 as shown at 253 and rendered by the browser or other rendering software running on the computer 218. Similarly, page P2 includes references, in the form of hyperlinks HL P21, HL P22 and HL P23 (for example) to pages P21, P22 and P23. The present invention, therefore, provides for the computer 218 to identify each of these hyperlinks HL P21, HL P22 and HL 2P3 and to request one or more of the pages P21, P22 and P23 referred to by the identified hyperlinks independently of the user, as shown at 254. Responsive to this request 254, the Web server may retrieve and/or assemble the requested pages P21, P22 and/or P23 (and may access the database(s) 103 in the process) and may send the requested pages P21, P22 and/or P23 to the computer 218, as shown at 256. The identifying of the hyperlinks, the request for the documents referenced by the identified hyperlinks and the sending thereof by the Web server and subsequent receipt by the computer 218 make take place within the interval t4-t3; that is, during the time the user is browsing the currently displayed page (P2 in this case). The computer 218, according to the present invention, may store these pages P21, P22 and/or P23 in storage that is local to the computer 218; that is, in the cache 220. Should the user then select page P23 as the next page to view, page P23 may be retrieved from the cache 220 as shown at 257 and page P23 (shown at 217 in FIG. 2) rendered very rapidly; that is, without the delay conventionally associated with requesting the page from the Web server 202 and waiting for its delivery.

Similarly, as shown at 258, page P23 includes references, in the form of hyperlinks HL P231, HL P232 and HL P233 to pages P231, P232 and P233, respectively. The present invention, therefore, provides for the computer 218 to identify each of these hyperlinks HL P231, HL P232 and HL P233 and to request one or more of the pages P231, P232 and P233 referred to by the identified hyperlinks independently of the user, as shown at 258. Responsive to this request 258, the Web server 202 may retrieve and/or assemble the requested pages P231, P232 and/or P233 (and may access the database(s) 103 in the process) and may send the requested pages P231, P232 and/or P233 back to the computer 218, as shown at 260, all carried out during the time interval t7-t6. The computer 218, according to the present invention, may store these pages P231, P232 and/or P233 in the cache 220 coupled to the computer 218. If the user then selects any one of the pages P231, P232 or P233 as the next page to view, page P231, P232 and/or P233 may be retrieved from the cache 220 and rendered without the delay conventionally associated with requesting the page from the Web server and waiting for its delivery.

If the requested page or document is not present in the cache 220, a request-response cycle may be initiated by the computer 218 to request the desired page or document from the Web server 202. This may be the case in which the user jumps rapidly from one page to another, clicking hyperlinks and requesting Web pages and/or documents in rapid succession. Indeed, depending upon the speed of the connection, the network traffic and/or the size of the files to be sent from the Web server 202 to the computer 218 (and/or other factors), there may be insufficient time in which to download any or all of the pages or documents referred to within the currently displayed page. In that case, however, the response time of the system may be no worse than would otherwise be if the present invention were not implemented. Indeed, the time necessary to check the cache 220 to determine whether the next requested page is present therein is small as compared to the time necessary for a conventional request-response cycle to and from the computer 218 and the Web server 202. To supplement FIG. 2, a map of the Web site being accessed by the user of the computer 218 and serviced by the Web server 202 is shown to the right of the database 103, the currently displayed page being shown in hash fill.

The functionality enabling the identification of some or all references on the currently viewed page and the generation of the subsequent request for some or all of the identified references may be carried out by a plug-in application of the browser software running on the computer 218, or as an applet (a small program that may be sent to the user along with a Web page), for example. Currently, the applet implementation is preferred, as it does not require the user of the computer 218 to download any program, as is the case with a plug-in application. According to an embodiment of the present invention, the applet may not have any visible manifestations to the user; it may be a functional applet only. The applet may download each of the pages referenced by the hyperlinks present in the currently displayed page or may only download selected pages. A JavaScript (for example, although the present invention is limited thereto) code function may also be embedded in the Web page (such as Web page 215 in FIG. 2). The JavaScript function may be configured to take as a parameter an attribute that specifies the URL of the target of the hyperlink. For example, the Web page may include a JavaScript code function called preemptivedwnld( ), which takes the HTML href attribute as a parameter as follows: preemptivedwnld(href= "http:www.homepage_FIG. 2.html"). In this manner, when the user of the computer 218 clicks on a hyperlink such as HL P2 in FIG. 2, the clicked hyperlink HL P2 gets passed as a parameter to the JavaScript function. The purpose of this function is to invoke the applet and check whether the requested page P2 is present in the cache 220. If the requested page P2 is indeed present in the cache 220, P2 is provided from the cache 220. If the requested page P2 is not present in the cache 220, the applet may generate a request therefor and send the request to the Web server 202. The requested page may then be received by the computer 218, stored in the cache 220 and/or rendered by the browser running on the computer 218 (or may be rendered by other suitable software running on the computer 218). In the case of an applet, the cache 220 may reside solely in memory (the RAM of the computer 218) and may not reside on the file system of the computer 218, due to concerns relating to applet security. In the case wherein a plug-in application is utilized instead of an applet, the browser's own cache on the fixed disk (for example) of the computer 218 may be utilized as the cache 220. Other implementations are possible, the present invention not being limited to embodiments utilizing applets and/or JavaScript.

The size of the cache memory 220 may be fixed or may be selected by the browser and/or user. Most any method for maintaining the contents of the cache memory may be implemented to insure that the contents thereof remain valid. That is, there should preferably be some mechanism to maintain the coherency of the content (Web pages, for example) of the cache 220. As Web sites change frequently, there should also preferably be some mechanism to invalidate stale (old and superseded) entries in the cache 220 and to store fresh entries therein. Those of skill in this art will recognize that many such mechanisms may be implemented herein. For example, the entries in the cache 220 may be invalidated after a specific time period has elapsed or by a specific date, to insure that the computer 218 does not display stale Web pages to the user from its cache 220.

A history of the pages of the Web site serviced by the Web server 202 and viewed by the user of the computer 218 may be created and maintained. This history may identify those Web pages viewed by the user over time. Such a history may be created by the computer 218 and may be passed to the Web server 202 when the user of the computer 218 first logs onto the Web site. Thereafter, the Web server 202 may use the historical information stored in the history to preemptively download selected pages to the remote computer 218.

The computer 218, in turn, may be configured to store these preemptively downloaded pages into the cache 220 to provide ready and rapid access thereto should the user select one of the cached pages as the next page to view. That is, the Web server 202 may download one or more of the historically most frequently accessed (e.g., viewed) pages of the Web site in the hopes that the user will conform to his or her past viewing habits and once again select one of the preemptively downloaded pages as the next page to be displayed.

Figure 3:
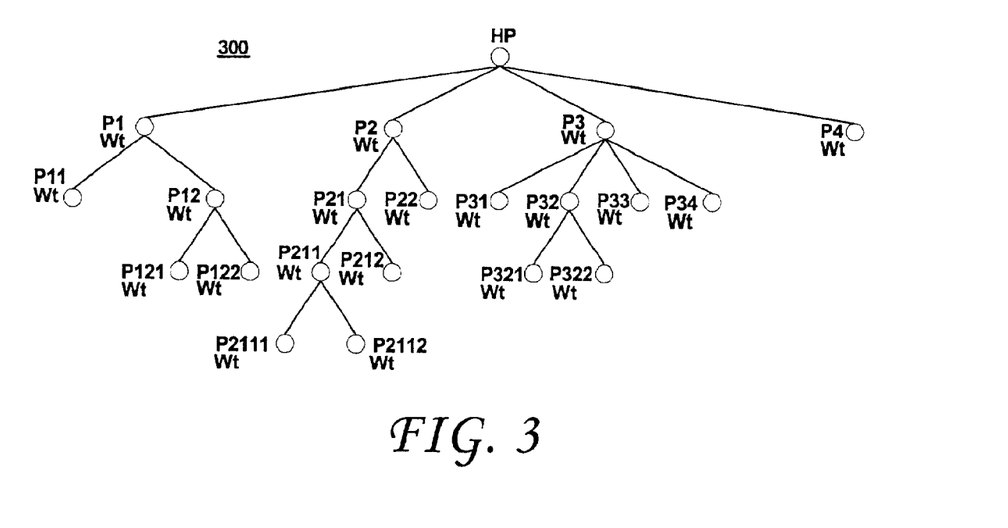
FIG. 3 shows a map of an exemplary Web site.

FIG. 3 shows a hierarchical structure representing a map of a Web site 300. As shown therein, the hierarchical structure shows the top-level page (typically the home page HP of the Web site 300) and a number of hierarchically lower pages P1 through P322. The lines between the pages represents a hyperlink from a page to a hierarchically lower page or to some other hierarchically-unrelated page. Therefore, in the exemplary Web site 300, the home page HP includes four hyperlinks, one to page P1, one to page P2, one to page P3 and another one to page P4. The first time the user logs onto the Web site's home page HP, the computer 218 may request one or more of the pages referenced by the home page HP; that is, may request one or more of the pages P1 through P4, and may do so independently of any user action. These pages may then be stored in the cache 220 of the user's computer 218 and provided to the browser running on the computer 218 or other rendering software when selected by the user. Thereafter, the list of such pages actually selected by the user (the user's recent browsing history) may be stored in a file (such as a cookie, for example) configured to be sent to the Web server 202 and stored in the database 102 the next time the user of the computer 218 logs onto the Web site 300. Such a file would then uniquely identify the user and provide some indication of this unique user's recent browsing history. As the history represents the browsing history of the user of the computer 218, it may also be used for marketing purposes, such as to provide targeted emails and advertisements. Any means of uniquely distinguishing each user from other users may be implemented within the context of the present invention.

Upon subsequent visits by the user of the computer 218 to the Web site 300, the Web server 202 may preemptively download one or more pages to the computer 218 based upon a prediction of a subsequent request by the computer 218 and/or based upon the history of pages previously accessed by the computer 218. The prediction may be simply based upon the next hierarchically lower pages of the Web site. For example, if the computer 218 has just accessed page P211, it may be likely that the user may next wish to access page P2111 and/or P2112, as these pages are the next hierarchically lower pages of the site 300. However, the preemptive downloading of pages from the site 300 (or of any other site) may be based upon any other prediction that achieves the result of enhancing the user's browsing experience.

Alternatively, upon subsequent visits by the user of the computer 218 to the Web site 300, the file containing the user's prior browsing history may be sent to the Web server 202. The Web server 202 may receive this history and preemptively download the most frequently accessed pages of the Web site 300 (as determined by the history) to the user's computer 218. These preemptively downloaded files may be stored in the cache 220, enabling a very rapid rendering thereof should the user again select one or more of the preemptively downloaded pages as the next page to view. To help determine which pages should be preemptively downloaded from the Web server 202 to the computer

218, a weight coefficient may be assigned to each page of the Web site 300. The value of each of the weighting coefficients may be based upon the frequency of access to the page to which the weighting coefficient is assigned. In this manner, the weighting coefficients may control which pages are preemptively sent to the computer 218. The history may be configured as a linked list, for example, each member of the list being uniquely associated with one of the pages HP through P322 and each member including a weighting coefficient associated therewith. According to one embodiment of the present invention, each time the user accesses a page of the site 300, the value of the weighting coefficient associated with the accessed page is increased (or decreased). Thereafter, the page or pages associated with the highest (or lowest) weighting coefficients may be preemptively downloaded to the computer 218.

Figure 4:
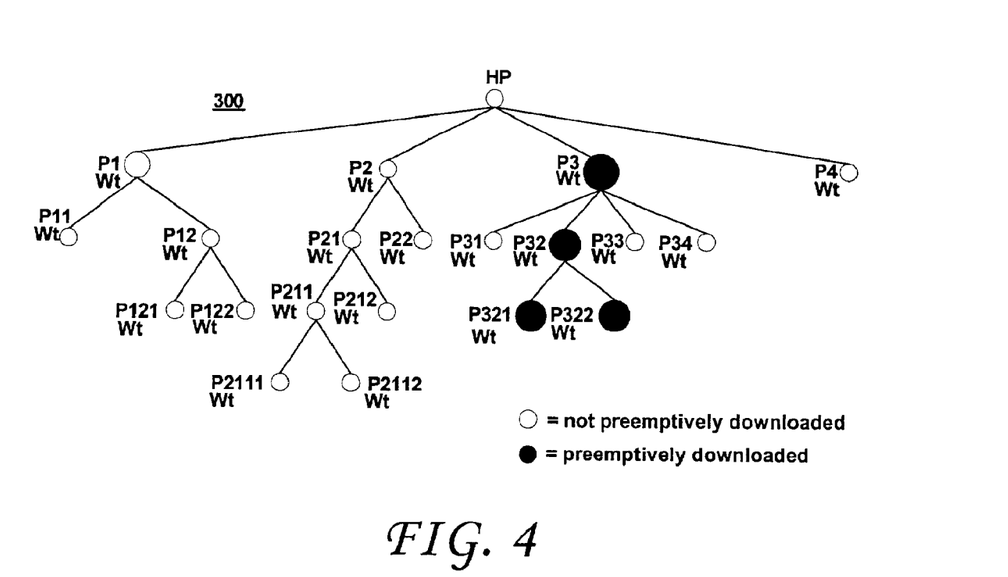
FIG. 4 shows the Web site map of FIG. 3, identifying pages thereof that may be preemptively sent to a remote computer based upon a prediction of a subsequent request by the remote computer and/or a history of the pages previously accessed by the remote computer.

FIG. 4 shows the site 300 and the pages thereof that may be preemptively downloaded by the Web server 202 to the computer 218 based upon a history of previously accessed pages by the computer 218. In FIG. 4, the size of the dark circles is proportional to the magnitude of the value of the assigned weighting coefficient associated with the page. In the exemplary example of FIG. 4, the weighting coefficients associated with pages P1, P3, P32, P321 and P322 are larger than the weighting coefficients associated with the other constituent pages of the site 300, as these pages were frequently accessed by the computer 218 during previous visits to the site. Therefore, these pages are likely candidates for being again selected by the user of the computer 218. All of these, therefore, may be preemptively downloaded by the Web server 202 to the computer 202 and stored within the cache 220 thereof. However, because of the space available in the cache 220, the speed of the connection between the computer 218 and the Web server 202 and/or other considerations, it may be desirable to limit the number of pages to be preemptively downloaded. Toward that end, a weighting coefficient threshold value may be defined to define a minimum (or maximum) value of the weighting coefficient for purposes of preemptive downloading. Therefore, if the magnitude of the value of the weighting coefficient associated with page P1 does not meet the redefined minimum (or maximum) threshold, only pages P3, P32, P321 and P322 may be preemptively downloaded to the computer 218, again independently of any request therefor by the computer 218 and/or the user thereof. The history may be maintained and updated upon each access of the Web site 300 by the computer 218, to track the user's browsing habits over time and enhance the speed at which requested pages may be rendered upon the computer 218.

The history may not only track previously accessed pages, but may also track other actions, such as mouse rollovers by the user of the computer 218. Indeed, an advertisement or other document may be preemptively downloaded and stored in the cache 220 based upon perceived user interest. Such interest may be measured, for example, by counting the number of times a cursor (such as shown at 112 in FIG. 2), is moved over a particular active area of a window or hyperlink visible on the display of the computer 218. According to the present invention, the document or page associated with the active area may then be preemptively downloaded in the background to the computer 218 in anticipation of the user eventually requesting the page or document associated with the active area. Other mechanisms for selecting documents or pages to preemptively download will occur to those of skill in this art and all such mechanisms are believed to fall within the purview of the present invention.

Figure 5:
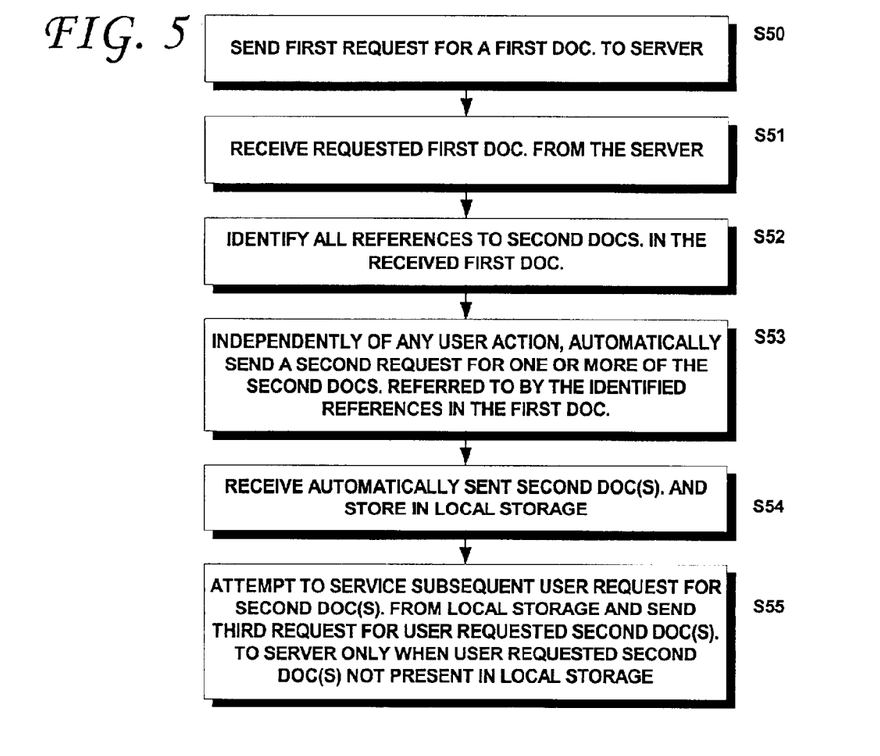
FIG. 5 is a flowchart of an embodiment of the present invention.

FIG. 5 is a flowchart of a method for a first computer to request documents from a second computer such as a server, according to an embodiment of the present invention. FIG. 5 is shown from the point of view of a client computer in a client-server architecture, such as shown at 218 in FIG. 2. As shown therein, step S50 calls for sending a first request for a first document to the server, responsive to a first user action. The first user action may include, for example, clicking on a hyperlink or entering a URL of a desired Web page into a browser. As shown in S51, the first computer then receives the requested first document (such as a Web page, for example) from the server. The first computer, according to the present invention, may then identify all references (such as hyperlinks, for example) to second documents in the received first document in step S52. Such second documents may be hierarchically lower Web pages from the same Web site as the first document or may be or may include documents that are unrelated to the Web site requested in the first request (step S50). The first computer, as shown at S53, may then automatically send a second request for one or more of the second documents referenced by the references identified in step S52. Step S53, according to the present invention, may be carried out independently of any user action; that is, independently of the user clicking or otherwise selecting a hyperlink or entering a URL into a browser or other software. The second document(s) requested in step S53 are then received by the first computer (such as 218 in FIG. 2) and stored in a storage that is local to the first computer (such as cache 220). As outlined in step S55, the present invention then calls for first attempting to service subsequent user requests for second documents from the local storage. That is, the computer 218, according to the present invention, is configured to first check the local storage (220 in FIG. 2) for subsequent user-requested second documents. If the subsequently requested second document is indeed present in local storage and is not stale (has not been invalidated and is the most recent version thereof), the subsequently request second document may be provided directly from the local storage and rendered on the first computer's display, without resorting to a request-response cycle to request and receive the subsequently requested document from the server. Only if the subsequently requested document is not present in the local storage need a third request therefor be sent to the server. As described earlier, a history of the documents requested may be generated, maintained and sent to the server upon subsequent accesses to the Web site. Steps S53 and S54 may be interrupted at any time by a user request.

Figure 6:
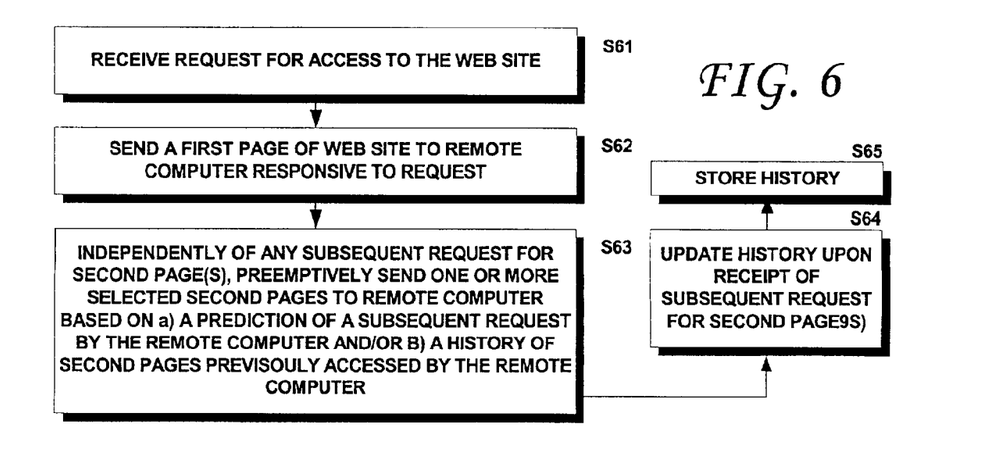
FIG. 6 is a flowchart of another embodiment of the present invention.

FIG. 6 is a flowchart of servicing requests for access to a Web site, according another embodiment of the present invention, from the point of view of a server computer in a client-server architecture, as shown at 202 in FIG. 2. Beginning at Step S61, the Web server may receive a request for access to a Web site and may then send a first page (the home page, for example) of the Web site to the requesting remote computer (such as computer 218 in FIG. 2 for example), as shown in step S62. As shown in step S63, independently of any subsequent request for a second page or pages, the Web server, according to the present invention may preemptively send one or more selected second pages to the remote computer. The selection of the second pages preemptively sent to the remote computer may be based upon, for example, a prediction of a subsequent request for one or more second pages by the remote computer and/or a history of second pages previously accessed by the remote computer. If and when a subsequent request for a second page is received from the remote computer, the history may be updated, optionally by adding or subtracting members from the list of previously accessed pages of the history and/or by changing the weighting coefficients associated with the constituent members of the history. The history may then be stored on the server (on the database 103 coupled to the server 202, for example) and/or sent back to the remote computer in a file, such as a cookie.

Hardware Description

Figure 7:
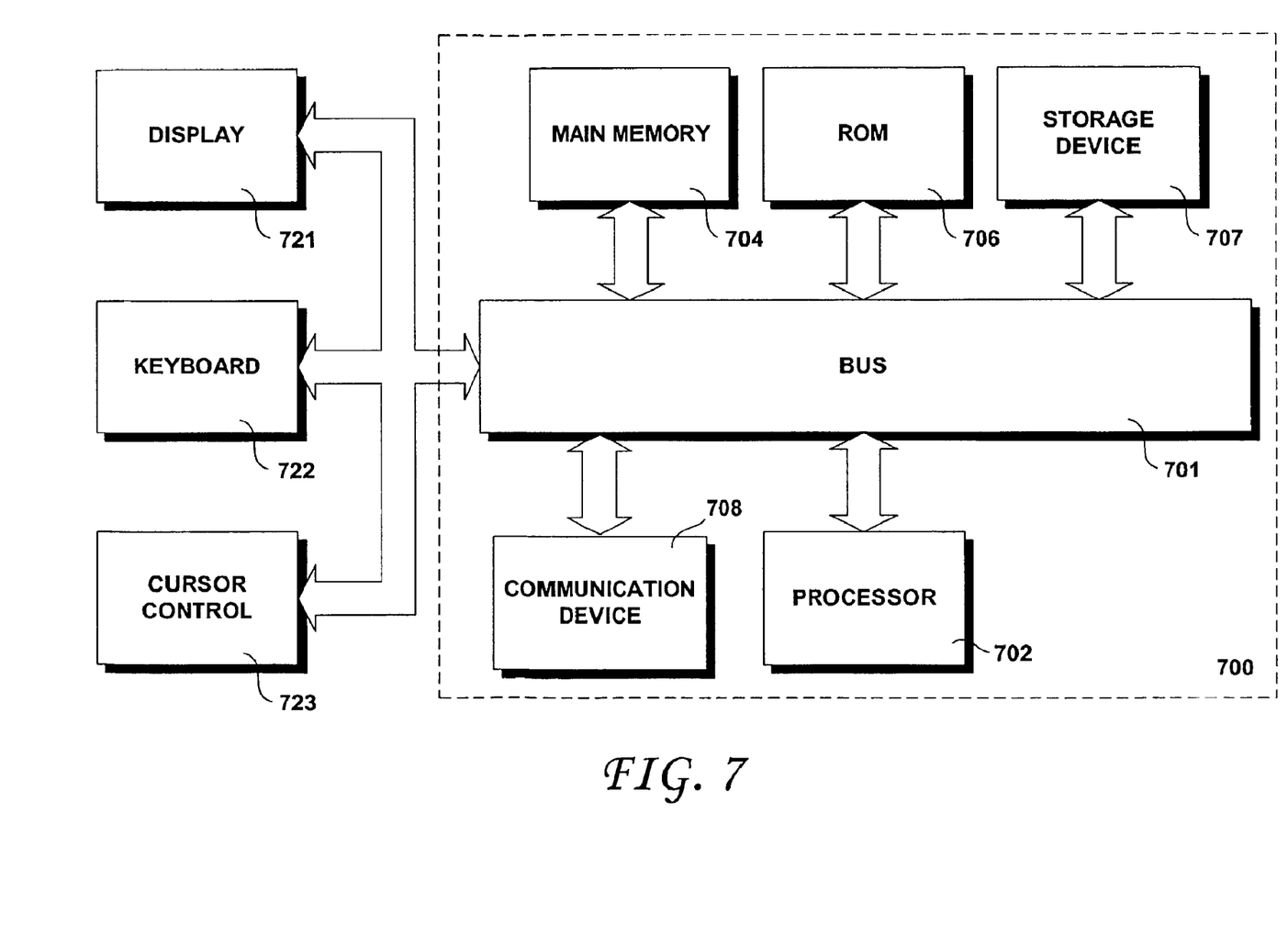
FIG. 7 is a block diagram of a computer with which the present invention may be practiced.

FIG. 7 illustrates a block diagram of a computing device 700 with which an embodiment of the present invention may be implemented. Computing device 700 includes a bus 701 or other communication mechanism for communicating information, and a processor 702 coupled with bus 701 for processing information. Computing device 700 further comprises a random access memory (RAM) or other dynamic storage device 704 (referred to as main memory), coupled to bus 701 for storing information and instructions to be executed by processor 702. Main memory 704 also may be used for storing temporary variables or other intermediate information during execution of instructions by processor 702. Computing device 700 may also include a read only memory (ROM) and/or other static storage device 706 coupled to bus 701 for storing static information and instructions for processor 702. A data storage device 707, such as a magnetic disk or optical disk, may be coupled to bus 701 for storing information and instructions. A communication device 708, such as a modem or network (such as Ethernet, for example) card is also coupled to the bus 701 to provide access to a network, such as shown at 101 in FIG. 2.

The computing device 700 may also be coupled via bus 701 to a display device 721, such as a cathode ray tube (CRT), for displaying information to a computer user. An alphanumeric input device 722, including alphanumeric and other keys, is typically coupled to bus 701 for communicating information and command selections to processor 702. Another type of user input device may be the user's own voice or cursor control 723, such as a mouse, a trackball, or cursor direction keys for communicating direction information and command selections to processor 702 and for controlling cursor movement on display 721.

The present invention is related to the use of computing device 700 to request documents from a second computer and/or for servicing a request for access to a Web site by a remote computer. According to one embodiment, the processing may be carried out by one or more computing devices 700 in response to processor(s) 702 executing sequences of instructions contained in memory 704. Such instructions may be read into memory 704 from another computer-readable medium, such as data storage device 707 and/or from a remotely located server. Execution of the sequences of instructions contained in memory 704 causes processor(s) 702 to implement the functionality described above. In alternative embodiments, hard-wired circuitry may be used in place of or in combination with software instructions to implement the present invention. Thus, the present invention is not limited to any specific combination of hardware circuitry and software.

While the foregoing detailed description has described preferred embodiments of the present invention, it is to be understood that the above description is illustrative only and not limiting of the disclosed invention. Those of skill in this art will recognize other alternative embodiments and all such embodiments are deemed to fall within the scope of the present invention. Thus, the present invention should be limited only by the claims as set forth below.

What is claimed is:

1. A method for a first computer to request documents from a second computer, comprising the steps of:
   responsive to a first user action, sending a first request for a first document to the second computer;
   receiving the first document sent by the second computer responsive to the first request; identifying all references to second documents in the received first document;
   creating and maintaining a history of second documents that the user has previously requested and sending the history to the second computer;
   receiving, from the second computer, at least one second document referred to in the history sent to the second computer and storing the received at least one second document in a storage that is local to the first computer, and
   responsive to a user request for at least one of the second documents, attempting first to service the user request from the local storage and sending a third request to the second computer for the at least one of the second documents only when the at least one of the second documents is not stored in the local storage.

2. The method of claim 1, wherein at least one of the first document and the at least one second documents includes an eXtensible Markup Language (XML) document.

3. The method of claim 1, wherein at least one of the first document and the at least one second documents includes a Hyper Text Markup Language (HTML) document.

4. The method of claim 1, wherein at least one of the first and second documents includes a Web page.

5. The method of claim 1, wherein at least one of the first, second and third requests includes a Hyper Text Transfer Protocol (HTTP) request.

6. A computer configured to request documents from a second computer over a computer network, comprising:
   at least one processor;
   at least one data storage device;
   a plurality of processes spawned by said at least one processor, the processes including processing logic for:
   responsive to a first user action, sending a first request for a first document to the second computer;
   receiving the first document sent by the second computer responsive to the first request;
   identifying all references to second documents in the received first document;
   creating and maintaining a history of second documents that the user has previously requested and sending the history to the second computer;
   receiving, from the second computer, at least one second document referred to in the history sent to the second computer and storing the received at least one second document in a storage that is local to the first computer, and
   responsive to a user request for at least one of the second documents, attempting first to service the user request from the local storage and sending a third request to the second computer for the at least one of the second documents only when the at least one of the second documents is not stored in the local storage.

7. The computer of claim 6, wherein at least one of the first document end the at least one second documents includes an eXtensible Markup Language (XML) document.

8. The computer of claim 6, wherein at least one of the first document and the at least one second documents includes a Hyper Text Markup Language (HTML) document.

9. The computer of claim 6, wherein at least one of the first and second documents includes a Web page.

10. The computer of claim 6, wherein at least one of the first, second and third requests includes a Hyper Text Transfer Protocol (HTTP) request.

11. A method of servicing a request for access to a Web site by a remote computer, comprising:

a receiving step to receive the request for access to the Web site;

a first sending step to send a first page of the accessed Web site to the remote computer responsive to the request;

retrieving from the remote computer a history of second pages of the Web site that were previously accessed by the remote computer;

independently of any subsequent request for a second page of the Web site originating from the remote computer, preemptively carrying out a second sending step to send the remote computer at least one selected second page of the Web site from the retrieved history of second pages of the Web site that were previously accessed by the remote computer.

12. The method of claim 11, further comprising the step of servicing subsequent requested for second pages of the Web site originating from the remote computer.

13. The method of claim 11, further comprising the step of updating the history of previously accessed second pages based upon subsequent requests for second pages of the Web site originating from the remote computer.

14. The method of claim 13, wherein the updating step includes a step of assigning a weighting coefficient to each of the subsequently requested second pages based upon frequency of access, the weighting coefficients controlling which second pages are preemptively sent to the remote computer in the second sending step.

15. The method of claim 13, further comprising a step of retrieving a file from the remote computer, the file distinguishing the remote computer from among other remote computers.

16. The method of claim 13, wherein the file includes a cookie.

17. A computer configured to service a request for access to a Web site by a remote computer over a computer network, comprising:

at least one processor;

at least one data storage device;

a plurality of processes spawned by said at least one processor, the processes including processing logic for carrying out:

a receiving step to receive the request for access to the Web site;

a first sending step to send a first page of the accessed Web site to the remote computer responsive to the request;

retrieving from the remote computer a history of second pages of the Web site that were previously accessed by the remote computer;

independently of any subsequent request for a second page of the Web site originating from the remote computer, preemptively carrying out a second sending step to send the remote computer at least one selected second pane of the Web site from retrieved history of second pages of the Web site that were previously accessed by the remote computer.

18. The computer of claim 17, wherein the history is maintained in a cookie that is retrieved from the remote computer.

19. The computer of claim 17, further comprising the step of servicing subsequent requests for second pages of the Web site originating from the remote computer.

20. The computer of claim 17, further comprising the step of updating the history of previously accessed second pages based upon subsequent requests for second pages of the Web site originating from the remote computer.

21. The computer of claim 20, wherein the updating step includes a step of assigning a weighting coefficient to each of the subsequently requested second pages based upon frequency of access, the weighting coefficients controlling which second pages are preemptively sent to the remote computer in the second sending step.

22. The computer of claim 20, further comprising a step of retrieving a file from the remote computer, the file distinguishing the remote computer from among other remote computers.

23. The method of claim 20, wherein the file includes a cookie.

24. A method of servicing a request for access to a Web site by a remote computer, comprising:

a receiving step to receive the request far access to the Web site;

a first sending step to send a first page of the accessed Web site to the remote computer responsive to the request, and independently of any subsequent request for a second page of the Web site originating from the remote computer, preemptively carrying out a second sending step to send the remote computer at least one selected second page of the Web site based upon a prediction of a subsequent request by the remote computer, the prediction being based upon detected movements of a pointing device coupled to the remote computer.

25. A computer configured to service a request for access to a Web site by a remote computer over a computer network, comprising:

at least one processor;

at least one data storage device;

a plurality of processes spawned by said at least one processor, the processes including processing logic for carrying out:

a receiving step to receive the request for access to the Web site;

a first sending step to send a first page of the accessed Web site to the remote computer responsive to the request, and independently of any subsequent request for a second page of the Web site originating from the remote computer, preemptively carrying out a second sending step to send the remote computer at least one selected second page of the Web site based upon a prediction of a subsequent request by the remote computer, the prediction being based upon detected movements of a pointing device coupled to the remote computer.

* * * * *

UNITED STATES PATENT AND TRADEMARK OFFICE
CERTIFICATE OF CORRECTION

PATENT NO. : 6,871,218 B2
DATED : March 22, 2005
INVENTOR(S) : Sachin Dasai, Kiran Gurudutt Bellare and Max Schireson It is certified that error appears in the above-identified patent and that said Letters Patent is hereby corrected as shown below:

Column 12,
Line 6, after ";" start a new paragraph beginning with "identifying".
Line 62, replace "end" with -- and --.

Column 13,
Line 24, replace "requested" with -- requests --.
Line 62, replace "pane" with -- page --.

Column 14,
Line 26, replace "far" with -- for --.

Signed and Sealed this

Thirty-first Day of May, 2005

JON W. DUDAS
*Director of the United States Patent and Trademark Office*

UNITED STATES PATENT AND TRADEMARK OFFICE
CERTIFICATE OF CORRECTION

PATENT NO. : 6,871,218 B2
APPLICATION NO. : 10/011073
DATED : March 22, 2005
INVENTOR(S) : Desai et al.

Page 1 of 1

It is certified that error appears in the above-identified patent and that said Letters Patent is hereby corrected as shown below:

Column 13, line 39, replace [13] with "15."
Column 14, line 23, replace [20] with "22."

Signed and Sealed this

Sixth Day of July, 2010

David J. Kappos
*Director of the United States Patent and Trademark Office*